(12) United States Patent
Schwermann et al.

(10) Patent No.: US 9,483,253 B1
(45) Date of Patent: Nov. 1, 2016

(54) METHODS FOR CUSTOMIZATION OF DEFAULT APPLICATIONS ON A MOBILE COMMUNICATION DEVICE

(71) Applicant: Sprint Communications Company L.P., Overland Park, KS (US)

(72) Inventors: Nathan M. Schwermann, Lawrence, KS (US); M. Jeffrey Stone, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/701,156

(22) Filed: Apr. 30, 2015

(51) Int. Cl.
*G06F 9/445* (2006.01)
*H04L 29/08* (2006.01)

(52) U.S. Cl.
CPC ............... *G06F 8/65* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,441,831 B1 | 8/2002 | Abramowitz et al. | |
| 6,622,016 B1 | 9/2003 | Sladek et al. | |
| 6,647,260 B2 | 11/2003 | Dusse et al. | |
| 6,882,290 B2 | 4/2005 | French et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,046,998 B2 | 5/2006 | Verma et al. | |
| 7,072,653 B1 | 7/2006 | Sladek et al. | |
| 7,073,130 B2 | 7/2006 | Novak et al. | |
| 7,215,754 B1 | 5/2007 | Woodson et al. | |
| 7,260,382 B1 | 8/2007 | Lamb et al. | |
| 7,260,386 B1 | 8/2007 | Haldar et al. | |
| 7,500,198 B2 | 3/2009 | Mathews et al. | |
| 7,552,432 B2 | 6/2009 | Aiba | |

(Continued)

FOREIGN PATENT DOCUMENTS

| | | |
|---|---|---|
| WO | WO2009056148 A2 | 5/2009 |
| WO | WO2014022446 A1 | 2/2014 |

OTHER PUBLICATIONS

Ackerman, Samuel K., "Lecture Slides: Mapping User Interface Design to Culture Dimensions", Aaron Marcus and Associates, Inc., 2001.

(Continued)

*Primary Examiner* — Isaac T Tecklu

(57) ABSTRACT

A method of provisioning a dynamically customized default application installation to a user equipment (UE). The method comprises detecting that a Mobile Directory Number (MDN) is being assigned to a UE, and querying, in response to the detecting, at least one data store to identify demographic data and usage data associated with a subscriber account to which the MDN has been assigned. The method further comprises identifying areas of subscriber interest based on an analysis of the demographic data and usage data, ranking at least one application according to priority of inclusion in a customized interface pack, assembling the customized interface pack, wherein assembling the customized interface pack comprises including one or more applications in the customized interface pack based on priority of inclusion, and sending the customized interface pack to the UE, wherein the customized interface pack is installed on the UE.

20 Claims, 8 Drawing Sheets

(56) References Cited

U.S. PATENT DOCUMENTS

| | | |
|---|---|---|
| 7,558,953 B2 | 7/2009 | Osthoff et al. |
| 7,681,134 B1 | 3/2010 | Grechishkin et al. |
| 7,702,322 B1 | 4/2010 | Maurya et al. |
| 7,788,593 B1 | 8/2010 | Grechishkin et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,577,737 B1 | 11/2013 | Amacker et al. |
| 8,583,091 B1 | 11/2013 | Delker et al. |
| 8,589,911 B1 | 11/2013 | Sharkey et al. |
| 8,650,096 B2 | 2/2014 | Van Buskirk et al. |
| 8,819,639 B2 | 8/2014 | Schumacher |
| 8,838,087 B1 | 9/2014 | Delker et al. |
| 8,843,122 B1 | 9/2014 | Wick et al. |
| 8,863,232 B1 | 10/2014 | Tidd |
| 8,954,041 B1 | 2/2015 | Delker et al. |
| 8,972,592 B1 | 3/2015 | Delker et al. |
| 9,043,446 B1 | 5/2015 | Davis et al. |
| 9,092,291 B1 | 7/2015 | Adib et al. |
| 9,098,366 B1 | 8/2015 | Adib et al. |
| 9,123,062 B1 | 9/2015 | Delker et al. |
| 9,189,607 B1 | 11/2015 | Wick et al. |
| 9,357,378 B1 | 5/2016 | Delker et al. |
| 9,386,395 B1 | 7/2016 | Delker et al. |
| 9,398,462 B1 | 7/2016 | Delker et al. |
| 9,413,839 B2 | 8/2016 | Annan et al. |
| 9,442,709 B1 | 9/2016 | Delker et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0113940 A1 | 6/2004 | Brockway et al. |
| 2004/0148598 A1 | 7/2004 | Kita et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0055696 A1 | 3/2005 | Betzler et al. |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0150256 A1 | 7/2006 | Fanton et al. |
| 2006/0168340 A1 | 7/2006 | Heller et al. |
| 2006/0190569 A1 | 8/2006 | Neil et al. |
| 2006/0235760 A1 | 10/2006 | Sanjar et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1 | 4/2007 | Levkovitz et al. |
| 2007/0109580 A1 | 5/2007 | Yoshida |
| 2007/0130156 A1 | 6/2007 | Tenhunen et al. |
| 2007/0143740 A1 | 6/2007 | Hoerentrup et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0160970 A1 | 7/2008 | Srinivas Reddy et al. |
| 2008/0192714 A1 | 8/2008 | Kim et al. |
| 2008/0214172 A1 | 9/2008 | Anwer |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0064055 A1 | 3/2009 | Chaudhri et al. |
| 2009/0077495 A1 | 3/2009 | Bhat et al. |
| 2009/0181716 A1 | 7/2009 | Benco et al. |
| 2009/0186651 A1 | 7/2009 | You |
| 2009/0199176 A1 | 8/2009 | Nath et al. |
| 2009/0228824 A1 | 9/2009 | Forstall et al. |
| 2009/0254753 A1 | 10/2009 | De Atley et al. |
| 2009/0259974 A1 | 10/2009 | Lin |
| 2009/0260004 A1 | 10/2009 | Datta et al. |
| 2009/0288079 A1 | 11/2009 | Zuber et al. |
| 2009/0291674 A1 | 11/2009 | Choi |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0037204 A1 | 2/2010 | Lin et al. |
| 2010/0058431 A1 | 3/2010 | McCorkendale et al. |
| 2010/0060549 A1 | 3/2010 | Tsern |
| 2010/0087175 A1 | 4/2010 | Roundtree |
| 2010/0115438 A1 | 5/2010 | Chu |
| 2010/0121567 A1 | 5/2010 | Mendelson |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0269107 A1 | 10/2010 | Jung et al. |
| 2010/0281427 A1 | 11/2010 | Ghosh et al. |
| 2010/0311468 A1 | 12/2010 | Shi et al. |
| 2011/0034160 A1 | 2/2011 | Corda et al. |
| 2011/0072121 A1 | 3/2011 | Takasugi et al. |
| 2011/0161149 A1 | 6/2011 | Kaplan |
| 2011/0161484 A1 | 6/2011 | Van Den Bogaert et al. |
| 2011/0208822 A1 | 8/2011 | Rathod |
| 2011/0210933 A1 | 9/2011 | Forstall |
| 2011/0238496 A1 | 9/2011 | Gurbuxani et al. |
| 2011/0258301 A1 | 10/2011 | McCormick et al. |
| 2011/0295980 A1 | 12/2011 | Aldis et al. |
| 2011/0312387 A1 | 12/2011 | Heo et al. |
| 2011/0314389 A1 | 12/2011 | Meredith et al. |
| 2012/0016735 A1 | 1/2012 | Park et al. |
| 2012/0054022 A1* | 3/2012 | Kosashvili ........ G06F 17/30867 705/14.43 |
| 2012/0072311 A1* | 3/2012 | Khan ................. G06Q 30/0635 705/26.81 |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2012/0272178 A1 | 10/2012 | Oygard et al. |
| 2013/0013671 A1 | 1/2013 | Relan et al. |
| 2013/0080911 A1 | 3/2013 | Klemm |
| 2013/0097654 A1 | 4/2013 | Aciicmez et al. |
| 2013/0275915 A1 | 10/2013 | Wang |
| 2013/0294307 A1 | 11/2013 | Johansson et al. |
| 2014/0036697 A1 | 2/2014 | Annan et al. |
| 2014/0047559 A1 | 2/2014 | Vera et al. |
| 2014/0068779 A1 | 3/2014 | Tan et al. |
| 2014/0127662 A1 | 5/2014 | Kron et al. |
| 2014/0173462 A1 | 6/2014 | Mattingly et al. |
| 2014/0298320 A1 | 10/2014 | Xu et al. |
| 2015/0011311 A1 | 1/2015 | Relan et al. |
| 2015/0304506 A1 | 10/2015 | Zhu et al. |
| 2015/0331590 A1 | 11/2015 | Yasui |
| 2015/0370428 A1 | 12/2015 | Chan et al. |

OTHER PUBLICATIONS

Hollister, Sean, "Apple patent app hints at iPod-based phones, Peel 520 turns shades of green, red, blue and yellow," Engadget, http://

(56) References Cited

OTHER PUBLICATIONS www.engadget.com/2010/09/19/apple-patent-app-hints-at-ipod-based-phones-peel-520-turns-shad/, Sep. 19, 2010, p. 1.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.
Qualcomm, uiOne™, http://brew.qualcomm.com/brew/in/about/uione.html.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Foreign Communication From a Related Counterpart Application—International Search Report and Written Opiniondated Oct. 4, 2013, PCT/US2013/052805 filed on Jul. 24, 2013.
Foreign Communication From a Related Counterpart Application—International Preliminary Report on Patentability dated Feb. 12, 2015, PCT/US2013/052805 filed on Jul. 24, 2013.
Pre-Interview Communication dated Apr. 24, 2012, U.S. Appl. No. 12/876,220, filed Sep. 6, 2010.
FAIPP Office Action dated Jan. 24, 2014, U.S. Appl. No. 12/876,220, filed Sep. 6, 2010.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Feb. 26, 2013, U.S. Appl. No. 13/023,486, filed Feb. 8, 2011.
Notice of Allowance dated Jun. 4, 2013, U.S. Appl. No. 13/023,486, filed Feb. 8, 2011.
Pre-Interview Communication dated Mar. 28, 2014, U.S. Appl. No. 14/019,053, filed Sep. 5, 2013.
Notice of Allowance dated Aug. 13, 2014, U.S. Appl. No. 14/019,053, filed Sep. 5, 2013.
Office Action—Restriction Requirement dated Feb. 1, 2012, U.S. Appl. No. 12/876,221, filed Sep. 6, 2010.
Office Action dated May 10, 2012, U.S. Appl. No. 12/876,221, filed Sep. 6, 2010.
Final Office Action dated Jan. 11, 2013, U.S. Appl. No. 12/876,221, filed Sep. 6, 2010.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Pre-Interview Communication dated Jul. 19, 2012, U.S. Appl. No. 13/018,083, filed Jan. 31, 2011.
Final Office Action dated May 10, 2013, U.S. Appl. No. 13/018,083, filed Jan. 31, 2011.
Advisory Action dated Aug. 6, 2013, U.S. Appl. No. 13/018,083, filed Jan. 31, 2011.
Office Action dated Dec. 26, 2013, U.S. Appl. No. 13/018,083, filed Jan. 31, 2011.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Sep. 23, 2014, U.S. Appl. No. 13/018,083, filed Jan. 31, 2011.
Pre-Interview Communication dated Feb. 26, 2013, U.S. Appl. No. 13/118,058, filed May 27, 2011.
First Action Interview Office Action dated May 6, 2013, U.S. Appl. No. 13/118,058, filed May 27, 2011.
Final Office Action dated Sep. 10, 2013, U.S. Appl. No. 13/118,058, filed May 27, 2011.
Advisory Action dated Nov. 22, 2013, U.S. Appl. No. 13/118,058, filed May 27, 2011.
Office Action dated Mar. 18, 2014, U.S. Appl. No. 13/118,058, filed May 27, 2011.
Notice of Allowance dated Oct. 22, 2014, U.S. Appl. No. 13/118,058, filed May 27, 2011.
Supplemental Notice of Allowance dated Dec. 3, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Notice of Allowance dated Jan. 6, 2015, U.S. Appl. No. 13/045,292, filed Mar. 10, 2011.
Pre-Interview Communication dated Jun. 9, 2014, U.S. Appl. No. 13/271,207, filed Oct. 11, 2011.
FAIPP Office Action dated Dec. 2, 2014, U.S. Appl. No. 13/271,207, filed Oct. 11, 2011.
Notice of Allowance dated Mar. 30, 2012, U.S. Appl. No. 13/029,103, filed Feb. 16, 2011.
Notice of Allowance dated Apr. 29, 2013, U.S. Appl. No. 13/537,563, filed Jun. 29, 2012.
Office Action dated Mar. 14, 2013, U.S. Appl. No. 13/161,496, filed Jun. 16, 2011.
Notice of Allowance dated Jun. 27, 2013, U.S. Appl. No. 13/161,496, filed Jun. 16, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Final Office Action dated May 18, 2015, U.S. Appl. No. 13/659,889, filed Oct. 24, 2012.
Final Office Action dated Jun. 23, 2015, U.S. Appl. No. 13/563,709, filed Jul. 31, 2012.
Final Office Action dated Jun. 4, 2015, U.S. Appl. No. 13/271,207, filed Oct. 11, 2011.
Pre-Interview Communication dated Jun. 8, 2015, U.S. Appl. No. 14/476,339, filed Sep. 3, 2014.
Notice of Allowance dated Jul. 16, 2015, U.S. Appl. No. 14/476,339, filed Sep. 3, 2014.
Advisory Action dated Jul. 27, 2015, U.S. Appl. No. 13/659,889, filed Oct. 24, 2012.
FAIPP Pre-Interview Communication dated Jul. 24, 2015, U.S. Appl. No. 14/168,007, filed Jan. 30, 2014.
Fultz, David K., et al., "Virtual Preloads," filed Jan. 30, 2014, U.S. Appl. No. 14/168,007.
Office Action dated Dec. 17, 2014, U.S. Appl. No. 13/563,709, filed Jul. 31, 2012.
Office Action—Restriction Requirement dated Aug. 26, 2013, U.S. Appl. No. 13/031,123, filed Feb. 18, 2011.
Office Action dated Dec. 17, 2013, U.S. Appl. No. 13/031,123, filed Feb. 18, 2011.
Office Action dated Oct. 10, 2014, U.S. Appl. No. 13/031,123, filed Feb. 18, 2011.
Notice of Allowance dated Apr. 22, 2015, U.S. Appl. No. 13/031,123, filed Feb. 18, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.

(56) References Cited

OTHER PUBLICATIONS

Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Delker, Jason R., et al., Patent Application entitled "Dynamic Loading, Unloading, and Caching of Alternate Complete Interfaces," filed Sep. 30, 2013, U.S. Appl. No. 14/042,707.
Katzer, Robin Dale, et al., Patent Application entitled "Zone Architecture for Dynamic Targeted Content Creation," filed Oct. 11, 2011, U.S. Appl. No. 13/271,207.
Wick, Ryan A., et al., Patent Application entitled "Mobile Phone Controls Preprocessor" filed Sep. 3, 2014, U.S. Appl. No. 14/476,339.
Delker, Jason R., et al., Patent Application entitled "Transition Experience During Loading and Updating an Interface and Applications Pack," filed Oct. 24, 2012, U.S. Appl. No. 13/659,889.
Delker, Jason R., et al., Patent Application entitled "Ad Sponsored Communication Pack," filed Feb. 18, 2011, U.S. Appl. No. 13/031,123.
FAIPP Pre-Interview Communication dated Aug. 25, 2014, U.S. Appl. No. 13/940,251, filed Jul. 11, 2013.
First Action Interview Office Action dated Oct. 17, 2014, U.S. Appl. No. 13/940,251, filed Jul. 11, 2013.
Notice of Allowance dated Mar. 9, 2015, U.S. Appl. No. 13/940,251, filed Jul. 11, 2013.
FAIPP Pre-Interview Communication dated Aug. 25, 2014, U.S. Appl. No. 13/940,253, filed Jul. 11, 2013.
First Action Interview Office Action dated Oct. 17, 2014, U.S. Appl. No. 13/940,253, filed Jul. 11, 2013.
Notice of Allowance dated Mar. 6, 2015, U.S. Appl. No. 13/940,253, filed Jul. 11, 2013.
Mehrotra, et al., "SenSocial: a Middleware for Integrating Online Social Networks and Mobile Sensing Data Streams," ACM, Middleware '14, Dec. 8-12, 2014, Bordeaux, France.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
Office Action dated Sep. 15, 2015, U.S. Appl. No. 13/563,709, filed Jul. 31, 2012.
Advisory Action dated Oct. 29, 2015, U.S. Appl. No. 13/271,207, filed Oct. 11, 2011.
Pre-Interview Communication dated Dec. 1, 2015, U.S. Appl. No. 14/042,707, filed Sep. 30, 2013.
Notice of Allowance dated Feb. 8, 2016, U.S. Appl. No. 14/042,707, filed Sep. 30, 2013.
Advisory Action dated Jan. 29, 2016, U.S. Appl. No. 13/563,709, filed Jul. 31, 2012.
Office Action dated Dec. 1, 2015, U.S. Appl. No. 13/659,889, filed Oct. 24, 2012.
Final Office Action dated Jan. 28, 2016, U.S. Appl. No. 14/168,007, filed Jan. 30, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Notice of Allowance dated Mar. 1, 2016, U.S. Appl. No. 13/563,709, filed Jul. 31, 2012.
Office Action dated Mar. 14, 2016, U.S. Appl. No. 13/271,207, filed Oct. 11, 2011.
Notice of Allowance dated May 4, 2016, U.S. Appl. No. 13/659,889, filed Oct. 24, 2012.
Advisory Action dated Mar. 29, 2016, U.S. Appl. No. 14/168,007, filed Jan. 30, 2014.
Office Action dated Apr. 14, 2016, U.S. Appl. No. 14/168,007, filed Jan. 30, 2014.
Delker, Jason R., et al. "Network Access Tiered Based on Application Launcher Installation," filed May 25, 2016, U.S. Appl. No. 15/164,530.
Habiger, Matthew, "Systems and Methods for Customized Delivery of Virtually Installed Applications," filed Aug. 9, 2016, U.S. Appl. No. 15/232,569.
Final Office Action dated Aug. 4, 2016, U.S. Appl. No. 13/271,207, filed Oct. 11, 2011.
Notice of Allowance dated Aug. 3, 2016, U.S. Appl. No. 14/168,007, filed Jan. 30, 2014.

\* cited by examiner

METHODS FOR CUSTOMIZATION OF DEFAULT APPLICATIONS ON A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices such as mobile phones and smart phones may be capable of running a plurality of software applications. A mobile communication device may be referred to in some contexts as a user equipment (UE). Software applications include social media applications, weather applications, sports applications, gaming applications, map applications, and a wide variety of other applications. Executing software applications may provide a user of the mobile communication device with functionality that would be otherwise unavailable or inconvenient on the mobile communication device. For example, the user may find it convenient to use a software application to directly access a social media site rather than accessing the social media site manually by searching the Internet. In some cases, software applications may be installed at the time of manufacture or by the user of the mobile communication device.

SUMMARY

In an embodiment, a method of provisioning a dynamically customized default application installation to a user equipment (UE) is disclosed. The method comprises detecting, by a server computer, that a Mobile Directory Number (MDN) is being assigned to a UE, querying by the server computer, in response to the detecting, at least one data store to identify demographic data and usage data associated with a subscriber account to which the MDN has been assigned, and calculating, by the server computer, an amplitude of user interest in each of a plurality of predefined interest categories, based on an analysis of the demographic data and the usage data. The method further comprises ranking, by the server computer, at least one application according to priority of inclusion in a customized interface pack tailored to areas of user interest, wherein priority is determined at least in part based on the calculated amplitude of user interest in the interest categories, and assembling, by the server computer, the customized interface pack, wherein assembling the customized interface pack comprises including one or more applications in the customized interface pack based on priority of inclusion. The method further comprises sending the customized interface pack to the UE, wherein the customized interface pack is installed on the UE.

In an embodiment, a method of provisioning a dynamically customized default installation of applications to a user equipment (UE) is disclosed. The method comprises detecting, by a server computer, that a Mobile Directory Number (MDN) is being assigned to a UE, querying by the server computer, in response to the detecting, at least one data store to identify demographic data and usage data associated with a subscriber account to which the MDN has been assigned, calculating, by the server computer, an amplitude of user interest in each of a plurality of predefined interest categories, based on an analysis of the demographic data and the usage data, and querying by the server computer, in response to the detecting, at least one data store to identify service provider ranking rules. The method further comprises ranking, by the server computer, at least one application according to priority of inclusion in a customized interface pack tailored to areas of user interest, wherein priority is determined based on an evaluation of the application in view of both the calculated amplitude of user interest in the interest categories and identified service provider ranking rules, and assembling, by the server computer, the customized interface pack, wherein the customized interface pack comprises at least one application chosen based on priority of inclusion. The method further comprises installing the customized interface pack on the UE.

In an embodiment, a server computer configured to assemble a customized interface pack is disclosed. The server computer comprises a processor, a memory, and a server application stored in the memory that, when executed by the processor, configures the processor to query, in response to detecting that a Mobile Directory Number (MDN) is being assigned to a user equipment (UE), at least one data store to identify demographic data and usage data associated with a subscriber account to which the MDN has been assigned. The server application further configures the processor to calculate an amplitude of user interest in each of a plurality of predefined interest categories, based on an analysis of the demographic data and the usage data, rank at least one application according to priority of inclusion in a customized interface pack tailored to areas of user interest, wherein priority is determined based on the calculated amplitude of user interest in the interest categories, and assemble the customized interface pack, wherein the customized interface pack comprises at least one application chosen based on priority of inclusion. The server application further configures the processor to send the customized interface pack to the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
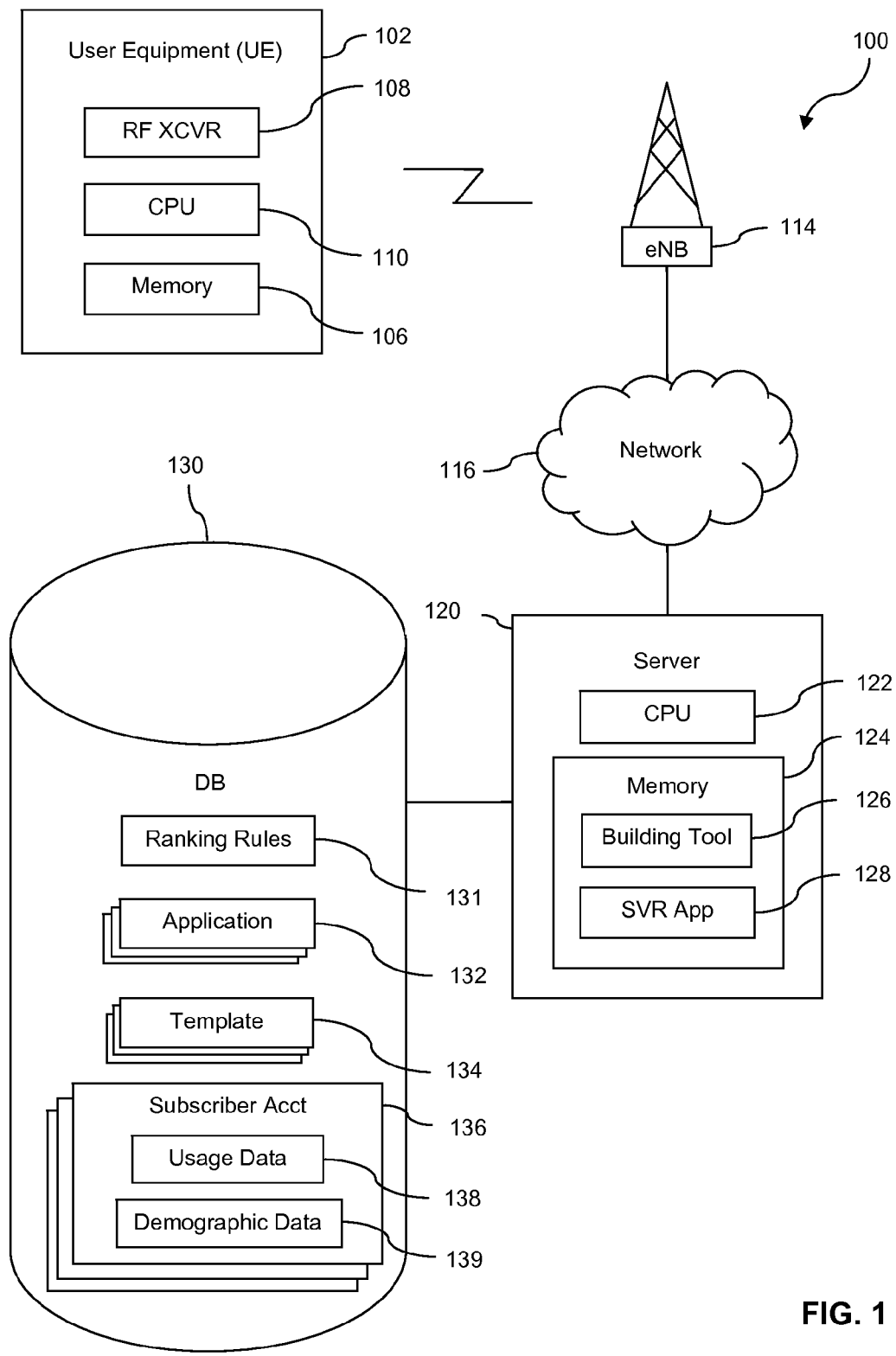
FIG. 1 is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, provisioning of a custom tailored default installation of applications and other interface components on a mobile communication device is described. When a user purchases and subsequently activates a mobile communication device, such as a mobile phone, the user is presented with a default interface configuration or default installation of applications and other interface components. The user's initial interactions with the mobile communication device may be shaped by a number of interface components, including but not limited to: wallpaper, ringtones, audible prompts, audible indications, audible tones, widgets, interface controls, and applications present on the mobile communication device. A user's interactions with and impressions of a mobile communication device may engage aspects of the appearance and operations of interfaces presented on the device, applications supported by the device, convenience features available through the device, as described above. The user's installation may further comprise links or short-cuts to carrier associated phone numbers such as customer care center phone numbers and/or to a carrier sponsored applications marketplace. When a generic default installation is provided to all users, there is a fair chance that an individual user would prefer different or additional wallpaper, ringtones, applications, etc., than those provided in the generic default installation.

A user dissatisfied with the default installation provided by the user's mobile communication device may endeavor to personalize the installation by moving or deleting default applications, downloading preferred applications, changing wallpaper, and/or by conducting other personalization activities. The personalization process can be time consuming and frustrating for the user. Businesses, such as service providers and application providers, sometimes enter into financial agreements concerning inclusion and placement of features, such as applications, in the default installation provided by a mobile communication device. Providing a generic default installation may increase the risk that a user is unhappy with the default installation which in turn may increase the risk of businesses having their applications deleted or relegated to scantly travelled real-estate on the mobile communication device despite paying a premium for inclusion in the default installation.

The present disclosure teaches dynamically building a customized interface pack for installation on a mobile communication device in order to provide an individually personalized default installation. In an embodiment, when a user undertakes to purchase a mobile communication device, information about the user's income, gender, age, occupation, and application usage history may be used to identify features (wallpaper, ringtones, applications, etc.) that will likely appeal to the user. This information may then be used to construct a customized interface pack comprising customization elements (e.g., wallpaper, ringtones, applications, etc.) selected for their likelihood to appeal to the user; thereafter, the customized interface pack may be installed on the mobile communication device. For example, the customized interface pack may comprise one or more gaming applications when the user's application usage history may indicate that the user regularly uses gaming applications. In an embodiment, the customized interface pack may be built and subsequently installed in response to activating the mobile communication device.

It is expected that installing a customized interface pack on a mobile communication device may increase the likelihood that a user will retain the applications, wallpaper, ringtones, etc., included therein. Thus, upon receiving a customized interface pack, the user may be spared some of the stress associated with personalizing the mobile communication device. Furthermore, installation of a customized interface pack provides a mutual benefit to businesses and mobile communication device users by providing access to applications likely to appeal to the users which, in some cases, the users may not have discovered on their own.

Turning now to FIG. 1, a communication system 100 is described. In an embodiment, the communication system comprises a UE 102, an enhanced node B (eNB) 114, a network 116, a server 120, and a data store (DB) 130. In some embodiments, the eNB 114 may be a base transceiver station (BTS) or a cell tower. Although the communication system 100 is depicted as comprising a single UE 102, a single eNB 114, a single network 116, a single server 120, and a single data store 130, it should be understood that, in some embodiments, the communication system 100 may comprise a plurality of UEs 102, a plurality of eNBs 114, a plurality of networks 116, a plurality of servers 120, a plurality of data stores 130, or combinations thereof that may work concurrently and/or constructively.

In an embodiment, the UE 102 comprises a radio frequency transceiver (RF XCVR) 108, a processor (CPU) 110, and a memory 106. The UE 102 may comprise a mobile phone, a smart phone, a personal digital assistant, a media player, a laptop computer, a notebook computer, and/or other mobile communication device. The UE 102 may communicate wirelessly with the eNB 114, and may thus access the network 116, via the radio frequency transceiver 108. Though not shown in FIG. 1, it should be understood that the UE 102 may comprise a display, a home screen, one or more additional screens, a ringer, speakers, and/or other features.

In an embodiment, the server 120 comprises a processor (CPU) 122 and a memory 124. The memory 124 comprises a building tool 126 and a server application (SVR App) 128. In an embodiment, the data store 130 comprises service provider ranking rules 131, at least one application 132, at least one interface pack template 134, and at least one subscriber account 136.

In an embodiment, the applications 132 may comprise one or more stub applications that may be virtually installed on the UE 102 via installation of a customized interface pack as described hereinbelow. Such stub applications may be used, in an embodiment, to virtually preinstall full applications by preinstalling limited functionality, updateable stub applications in place of corresponding full applications. In an embodiment, the stub applications may be called by interactive thumbnail images in a widget presented on a display of a UE. The widget may provide access to an application repository such that, in response to selecting the interactive thumbnail image, a full application corresponding to the stub application represented by the interactive thumbnail image may be downloaded to replace the stub application. In an embodiment, the stub application may be said to comprise a limited version of the full application in which installation permissions are satisfied such that the stub application may be updated to the full application. The limited functionality referred to does not refer to a trial or test version of the application but rather to a functionality that is directed primarily to downloading and installing the full application in response to user selection. In some circumstances, the use of virtual pre-installed applications (e.g., stubs) may conserve memory on a mobile device and decrease "app bloat." For more details on stub applications and virtual installation, see U.S. patent application Ser. No. 13/940,251, filed Jul. 11, 2013, entitled "Virtual pre-installation of Applications," by Fared A. Adib, et al., which is hereby incorporated by reference in its entirety.

The subscriber account 136 comprises usage data 138 and demographic data 139. The subscriber account 136 may comprise information concerning a subscription to receive service from a wireless communication service provider, e.g., the subscriber account 136 may comprise information about voice services, data services, text services, repair & maintenance services, information about UEs 102 served by a subscription, and/or other information.

In some cases, a single subscription to receive service may cover multiple UEs 102. For example, a family plan may be detailed in a single subscriber account 136 under a single subscription that provides service for each UE 102 owned by the members of the family. Accordingly, the subscriber account 136 may comprise information about each UE 102 and information about the different family members acting as users of the UEs 102. In an embodiment, the subscriber account 136 may comprise separate user profiles for the different users included in a subscription. Each user profile may comprise usage data 138 and/or demographic data 139 attributed to the user. In some cases, a user profile may comprise usage data 138 attributed to the user but demographic data attributed to the subscriber account 136 as a whole or vice versa.

In an embodiment, a user may purchase a UE 102. The user may be a first-time purchaser or may be purchasing a new or replacement UE 102. If the user is a first-time purchaser, the user may set up a subscriber account 136 in order to activate a subscription for wireless service. Demographic data 139 may be obtained about the user during setup of the subscriber account 136 and may be updated over time. Demographic data 139 may comprise information about user income, user gender, user occupation, user geographic location, and/or other information. In the case of a first-time purchaser, usage data 138 may be collected over time. Usage data 138 may comprise information about application usage history, website visitation history, historical home screen configuration, and/or about transactions completed using a UE 102. If the user is not a first-time purchaser, usage data 138 and/or demographic data 139 concerning the user may already be stored in the user's subscriber account 136.

The server application 128 may be configured to detect when the UE 102 purchased by the user is activated. For example, the server application 128 may detect that a Mobile Directory Number (MDN) (e.g., a phone number) has been assigned to the UE 102, that an Electronic Serial Number (ESN) has been assigned to the UE 102, an activation request from the UE 102, and/or the server application 128 may detect other activation indicators. The server application 128 may then initiate construction of a customized interface pack. The customized interface pack may be configured to provide a default installation on the UE 102 that is individually customized to the user through inclusion of customization elements selected based on likelihood of appealing to and/or of being of interest to the user. Customization elements may comprise applications, web widgets, network services, ring tones, ringback tones, alerting tones, wallpapers, and/or interface controls.

The server application 128 may perform an analysis of the usage data 138 and/or the demographic data 139 associated with the user in order to determine areas of interest to the user. It should be understood that areas not of interest to the user may factor into the analysis and may be identified using substantially similar methods as those used to identify areas of interest to the user. Information included in the usage data 138 and/or the demographic data 139 may be weighted such that certain information may have a greater effect on the analysis than other information. In some cases, e.g., in the case of a new user, there may not be enough information contained in the usage data 138 and/or in the demographic data 139 to differentiate areas of user interest. That being the case, equivalent likelihood of being of interest may be universally assigned to customization elements.

Areas of interest to the user may be stipulated and/or they may be determined based on satisfaction of one or more predetermined conditions. An area may be stipulated to be an area of interest for any reason including, but not limited to, based on a determination that, in general, a certain area is of interest to users with similar demographic data 139 and/or usage date 138 as the user. Thus, it may be stipulated that users in a certain geographic range are interested or uninterested in certain areas. For example, certain services may not be provided in a certain geographic range; accordingly, users within that range may be stipulated to have no interest in those services and therefore no interest in customization elements concerning those services.

In an embodiment, a tendency to install, retain, select, invoke, activate, and/or download applications, wallpaper, ringtones, and/or other features in a certain area may, in some cases, be considered interest in the area. For example, it may be discovered that users have a tendency to install applications that may be of use in performing tasks associated with their occupations. Thus, weather may be an area of interest when the user is employed as a wedding planner. Similarly, an area may be considered an area of interest if it satisfies one or more predetermined conditions such as meeting or exceeding one or more predetermined thresholds concerning likelihood of being of interest to the user. In some cases, an area's likelihood of being of interest to the user may be considered to be, and predetermined thresholds may be set for, the likelihood that a customization element in the area will be retained, selected, invoked, activated, downloaded, installed, and/or otherwise appreciated by the user.

An area's likelihood of being of interest to the user may be determined from the user's historical behavior documented in the usage data 138. In an embodiment, historical likelihood of an activity may define the likelihood that a customization element will be subjected to the same activity. For example, if the user has installed and used 50% of the gaming applications the user has been presented within the last year, it may be said that a customization element has a 50% chance of being installed and used when the customization element comprises a gaming application. Thus, the customization element may be said to have a 50% likelihood of being of interest to the user.

The usage data 138 may list applications previously installed by the user and their genres, screen configurations and duration of the configurations, wallpapers previously used by the user, websites visited by the user and the frequency of the visits, purchases made by the user, applications deleted by the user, use timeframes and frequency of use for applications, wallpapers, ringtones, ringbacks, and/or other usage history. The usage data 138 may also indicate the historical probability that an application, wallpaper, ringtone, and/or ringback would be installed retained, selected, invoked, activated, and/or downloaded. For example, the usage data 138 may indicate that the user has been presented 20 gaming applications and has installed and subsequently used 10 of them.

The usage data 138 may also indicate the timeframe associated with installation and subsequent use. For example, the usage data may indicate that the user has a history of installing and using 100% of the social media applications the user has been presented within one month of their presentation to the user. Higher rate of use, installation, downloading, or otherwise interacting with applications, wallpaper, ringtones, etc., may be indicative of greater user interest. Accordingly, timeframe may be used in evaluating whether or not an area is of interest to the user and timeframe thresholds may be set.

The server application 128 may rank customization elements, e.g., the applications 132, in order of priority of inclusion in a customized interface pack. The ranking may be based at least in part on the analysis of the usage data 138 and/or the demographic data 139 and may be determined in view of the service provider ranking rules 131. Customization elements may be ranked in priority against customization elements of the same type; thus, priority of a customization element may be priority as compared to customization elements of the same type, and ranking of customization elements of one type may not interfere with ranking and subsequent inclusion in a customized interface pack of customization elements of a different type. For example, wallpapers may be ranked according to priority of inclusion in a customized interface pack and the applications 132 may separately be ranked according to priority of inclusion in the customized interface pack such that neither ranking interferes with inclusion of customization elements of the other type in the customized interface pack.

Priority may be determined based on a holistic view of the results of the analysis of the usage data 138 and/or the demographic data 139, based on an itemized view of the results, or based on some combination thereof. If insufficient information is contained in the usage data 138 and/or in the demographic data 139 to differentiate based on likelihood of interest to the user and no other basis for assigning differing priority exists, e.g., no service provider ranking rules 131 to the contrary, equivalent priority may be assigned. As discussed above, information included in the usage data 138 and/or the demographic data 139 may be weighted such that certain information has a greater effect on the likelihood of being of interest to the user than other information; therefore, some information may have a greater effect on priority than other information. Higher priority may be given to customization elements, e.g., applications 132, determined to be more likely to be of interest to the user of the UE 102. In some contexts, a customization element that is more likely to be of interest to the user may be more likely to be invoked, retained, fully installed, downloaded, or otherwise used by the user.

For example, a first application 132 comprising a first gaming application may be assigned a higher priority than a second application 132 comprising a second gaming application when the usage data 138 indicates that the user has previously installed the first gaming application but not the second gaming application. In the example, both the first application 132 and the second application 132 comprise gaming applications; however, despite the fact that a holistic view of the analysis may indicate that gaming applications in general have an equal likelihood of appealing to the user, an itemized view of the analysis indicates that the first gaming application is more likely to be of interest to the user because it has been previously installed by the user.

The customization elements, e.g., applications 132, may be ranked in such a way that each customization element is given a discrete ranking that distinguishes it from all other customization elements of the same type except those with identical credentials. Alternatively, the customization elements may be ranked such that customization elements of the same type with credentials within a predefined range receive the same ranking. For example, applications 132 with 50% or greater likelihood of being of interest to the user may be given tier 1 priority, applications 132 with a likelihood of being of interest to the user that is ≥40% and <50% may be given tier 2 priority, and so on. In the example, with the exception of tier 1, the tiers are defined in approximately 10% increments; however, it is contemplated that the tiers may be defined using any number of different increments be they integers or fractions, and as indicated by tier 1, separate tiers may be defined by unequal increments. Applications 132 within the same tier, i.e. rank, may have identical priority of inclusion in the customized interface pack.

As discussed above, priority may be further determined based on additional factors other than appeal to user interest. For example, priority may be determined in view of the service provider ranking rules 131. Service provider ranking rules 131 may be weighted such that different rules may affect priority of inclusion in different magnitudes. In an embodiment, a customization element's priority may be determined by an evaluation of both service provider ranking rules 131 and areas of user interest. In an illustrative embodiment, the likelihood that a customization element will be invoked by a user of the UE 102 could be multiplied by the income potential, defined in the service provider ranking rules 131 as described below, in order to come up with the customization element's ranking. Both fields of evaluation may be weighted with regard to each other.

Service provider ranking rules 131 may comprise predetermined rules, formulas, standards, guidelines, and/or other instructions for ranking customization elements according to priority of inclusion in a customized interface pack. For example, the service provider ranking rules 131 may indicate that customization elements whose use by a user of the UE 102 results in a higher fee paid to the service provider—higher income potential—are given higher priority. In another example, priority may be positively affected and priority increased by increased rate of sale and/or by special promotions. In order to facilitate such ranking, the service provider ranking rules 131 may also comprise information about the financial agreements associated with customization elements (e.g., fees paid per selection of application 132), information about rate of sale of customization elements, information about special promotions, and/or other information relevant to application of the predetermined rules, formulas, etc., for ranking customization elements.

Financial agreements such as business agreements, contracts, transactions, and/or business deals (e.g., those pertaining to installation) may affect the ranking of customization elements such as the applications 132. For example, if a first application 132 is associated with a more favorable and/or more lucrative business agreement than a second application 132, the first application 132 may be given higher priority than the second application 132 even though the two applications 132 have an equal likelihood of being of interest to the user. In some cases, the weight given to business agreements may allow a third application 132 associated with a more favorable and/or lucrative business agreement to be given higher priority than a fourth application 132 associated with a less favorable and/or lucrative business agreement even though the fourth application 132 is more likely to be of interest to the user. Business agreements may only affect priority within a tier to which the customization element has been assigned or may only change priority by a predetermined number of tiers.

It is also contemplated that the service provider ranking rules 131 may effect a change in priority over time. For example, a customization element may be subject to an agreement that eliminates or reduces fees paid to the service provider after the customization element has been activated a specified number of times. In this case, the customization element may be given reduced priority after the threshold number has been reached. The service provider ranking rules 131 may also regulate priority based on other factors such as compatibility with the UE 102. Incompatibility with the UE 102 may result in a customization element receiving the lowest priority either as a discrete ranking or by being included in the lowest tier.

Following the ranking of the customization elements, the server application 128 may invoke the building tool 126 to assemble a customized interface pack that is individually personalized for the user. The inclusion of customization elements in the customized interface pack may be based on priority of inclusion. Higher ranked customization elements may be included in the customized interface pack before lower ranked customization elements of the same type until capacity for each type is reached. The customized interface pack may comprise a predetermined number of each type of customization element which may further be divided into subtypes. For example, a customized interface pack may comprise twelve wallpapers and twenty-four applications 132, wherein the applications 132 are divided into subtypes based on 12 comprising gaming applications, 6 comprising sports applications, 3 comprising social media applications, and 3 comprising online shopping applications.

If there are multiple customization elements of the same type with the same priority of inclusion competing for a spot in the customized interface pack, then there may be a tie-breaking system in place. For example, inclusion in the case of a tie may proceed in alphabetical order, according to random chance, in a predetermined priority, by including a preexisting interface pack or portion thereof, or inclusion in the case of a tie may proceed in some other way. A generic interface pack or portion thereof may be included when there is insufficient usage data 138 and/or demographic data 139 to assign different priorities among customization elements of the same type.

In an embodiment, the customized interface pack may be constructed from one of the interface pack templates 134. The interface pack template 134 may comprise generic elements such as generic wallpaper, generic ringtones, generic applications, etc. Alternatively, the interface pack template 134 may comprise customization elements selected based on their likelihood of appealing to the user. In that case, the interface pack templates 134 may be individually maintained, periodically updated based on an analysis of the usage data 138 and/or the demographic data 139 in order to remain in sync with user interests, and indexed according to the intended user.

The interface pack templates 134 may be configured to support the addition of one or more customization elements, e.g., applications 132, in order to create the customized interface pack. For example, if the interface pack template 134 on which the customized interface pack is being built can support the addition of a single application 132, then the application 132 with the highest priority may be included. In an embodiment, the interface pack template 134 on which the customized interface pack is being built may support the addition of several customization elements of different types. For example, the interface pack template 134 may support the addition of four wallpapers, eight applications 132, and three ringtones. In some cases, the interface pack template 134 may comprise a completed, generic interface pack and customization elements may take the place of generic elements if they meet likelihood of interest to the user thresholds set as described above.

Alternatively, the customized interface pack configured to provide an individually customized default installation may be assembled from scratch. Customization elements, e.g., applications 132, selected as described hereinabove may be included in the customized interface pack. In some cases, the customized interface pack may comprise only customization elements. In other cases, the customized interface pack may comprise customization elements along with generic applications, web widgets, ring tones, ringback tones, alerting tones, wallpapers, and/or interface controls that may each be selected based at least in part upon alphabetical order, random chance, a predetermined priority, or a preexisting interface pack or portion thereof.

After completion of the customized interface pack, the server application 128 may install the customized interface pack on the UE 102 via the network 116. In an embodiment, the customized interface pack may be available on the UE 102 shortly after the UE 102 has been activated. For example, once the UE 102 has been power cycled, the customized interface pack may be available.

Figure 2:
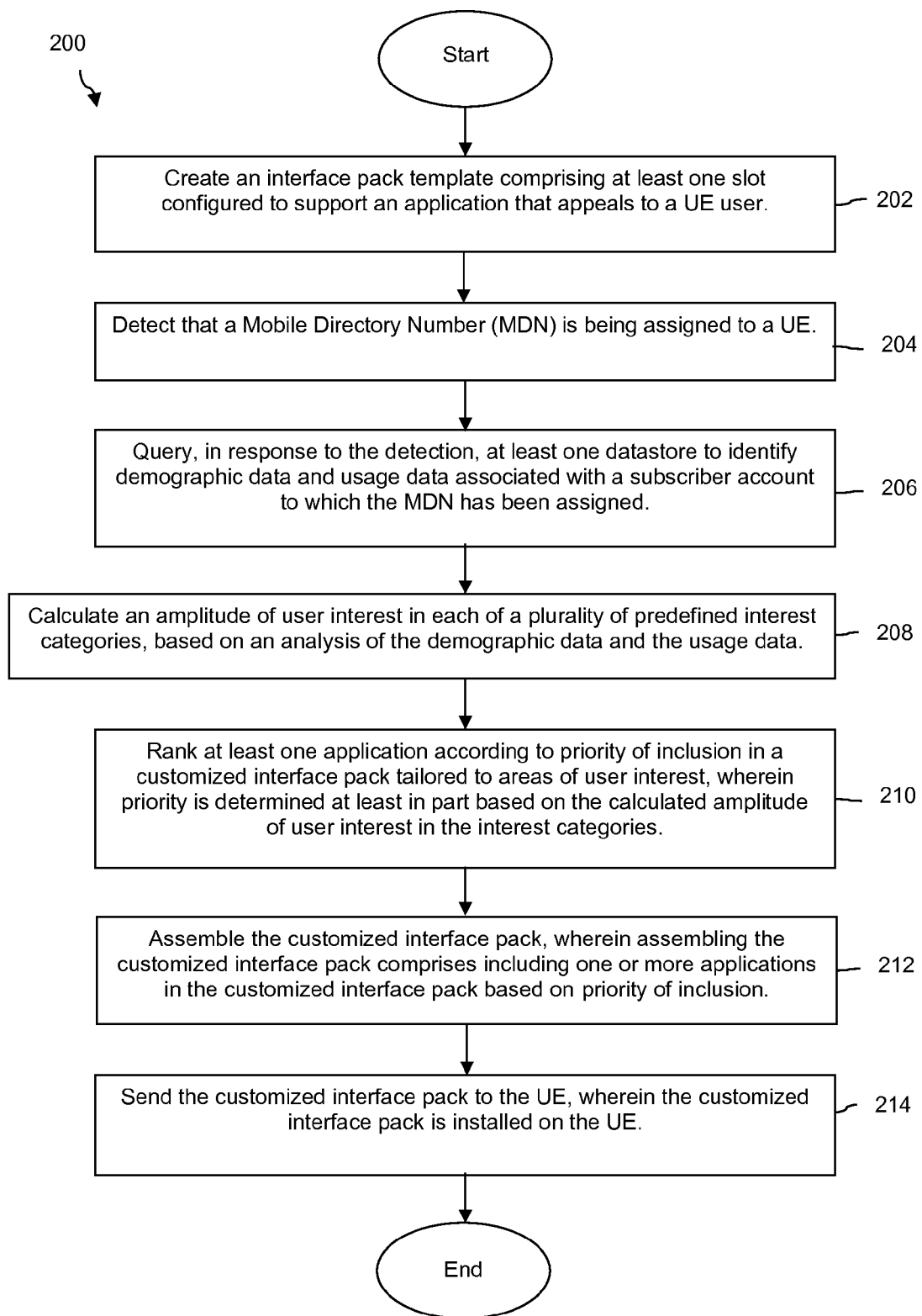
FIG. 2 is a flowchart of a method according to an embodiment of the disclosure.

Turning now to FIG. 2, a method 200 is described. In an embodiment, the method 200 may be performed in the context of the communication system 100 described hereinabove with reference to FIG. 1. For example, several of the steps of method 200 may be performed by a server computer, for example server computer 120. At block 202, an interface pack template comprising at least one slot configured to support an application that appeals to a UE user may be created. A plurality of interface pack templates may be created and stored in a data store. The interface pack template may comprise generic elements such as generic wallpaper, generic ringtones, generic applications, etc., and may be configured to support the addition of customization elements, such as the application that appeals to a UE user. In some cases, the interface pack template may be maintained in association with a subscriber account. In such cases, creating the interface pack template may comprise including customization elements which may be periodically updated.

At block 204, assignment of a Mobile Directory Number (MDN) to a UE may be detected. In response to the detection, at least one data store may be queried at block 206 in order to identify demographic data and usage data associated with a subscriber account to which the MDN has been assigned. At block 208, an amplitude of user interest may be calculated for each of a plurality of predefined interest categories, based on an analysis of the demographic data and the usage data. The calculation may be based on weights assigned to different demographic parameters and weights assigned to different usage behaviors. The calculation may multiply values associated with an individual—values of demographic information and values of usage behaviors—by the weighting values or coefficients to find an interest score for each interest category as the sum of these products (e.g., the sum of the coefficients or weightings times the associated value associated with the individual or user of the UE 102). Each different interest category may be associated with an independent specification of weights. The score of an individual in each interest category may be a scalar value. The score may be constrained to a standard range of values, for example from 0 to 1.0 or from 0 to 100. This scalar may be referred to as an amplitude of the subject interest category for the given user or individual.

Areas of user interest may be identified based on an analysis of the demographic data and usage data. The analysis may be performed in a substantially similar manner as that described hereinabove with reference to FIG. 1. An area may be identified as an area of user interest if it surpasses a predetermined threshold. For example, if a user downloads and runs 20% of available gaming applications the user is presented within one month of presentation, in some contexts, it might be said that gaming applications in general have a 20% likelihood of being of interest to the user. If the threshold for consideration as an area of interest to the user was set at 15% likelihood of being of interest to the user, then gaming applications may be considered an area of interest to the user.

At block 210, at least one application may be ranked according to priority of inclusion in a customized interface pack tailored to areas of user interest, wherein priority is determined based at least in part on the calculated amplitude of user interest in the interest categories. The amplitude of the user interest in the interest categories may provide information relevant to the likelihood that the application will be invoked by a user of the UE. In the example given above, in some contexts, a gaming application may be considered to have a 20% likelihood of being invoked by the user. When the gaming application is ranked in priority order as is done in block 210, the gaming application may be ranked above, i.e. higher priority of inclusion in a customized interface pack, an application with a 17% likelihood of being invoked by the user.

The customized interface pack may be assembled at block 212, wherein assembling the customized interface pack comprises including one or more applications in the customized interface pack based on priority of inclusion. In an embodiment, assembling the customized interface pack may comprise filling the one or more slots in the interface pack template with applications based on priority of inclusion. Higher priority applications may be included before lower priority applications. For example, if the interface pack template can only support two applications, the two applications with the highest priority of inclusion may be chosen. The customized interface pack may be sent to the UE at block 214. The sent customized interface pack may be installed on the UE, wherein installation may occur wirelessly over a network, and may occur at the same time or briefly after the UE has been activated. The server computer 120 may send the interface pack to the UE, or alternatively a different server computer may send the interface pack. For example, an activation server computer (not shown) may be responsible for sending the interface pack to the UE during the course of other activation processes.

Figure 3:
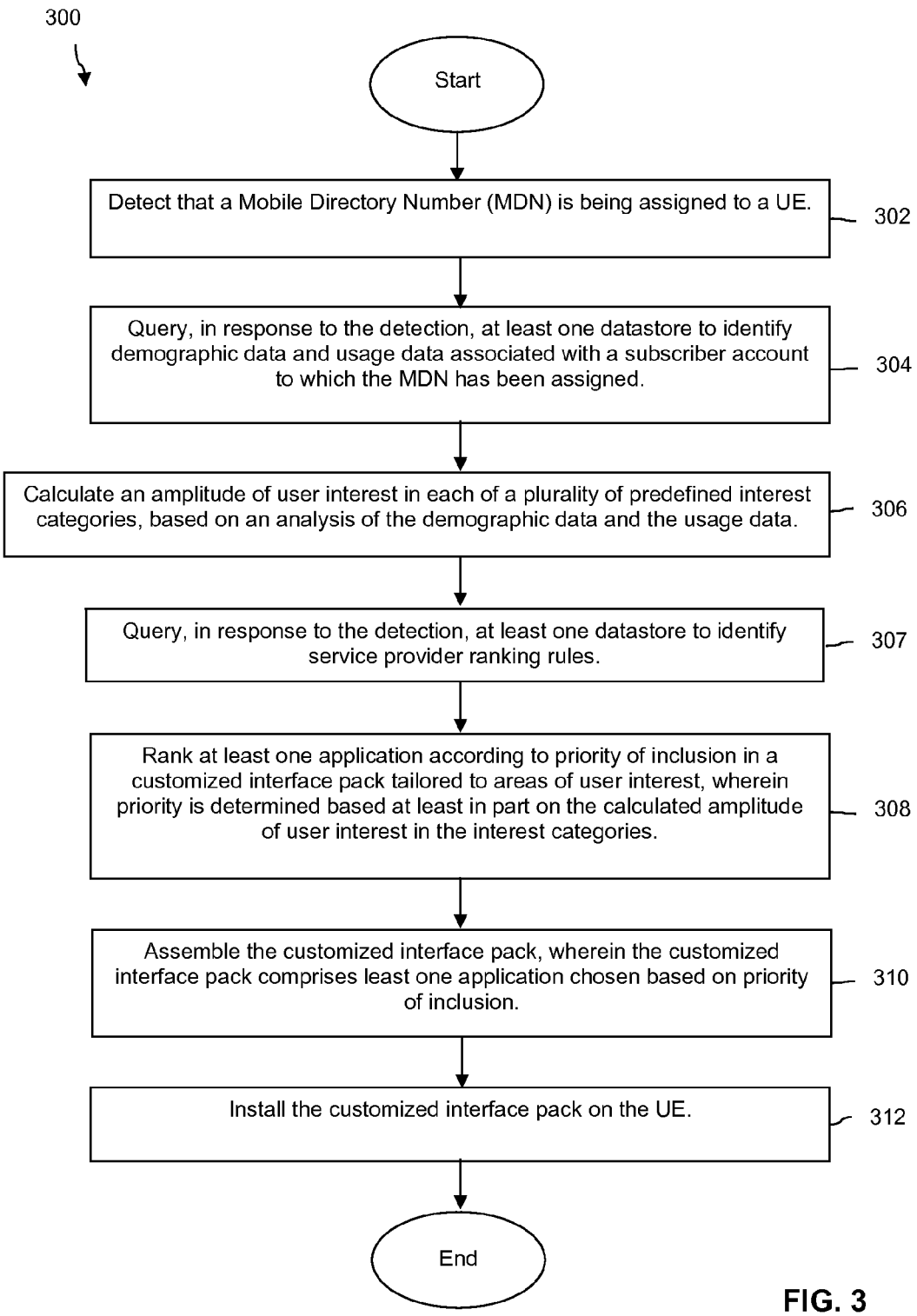
FIG. 3 is a flowchart of a method according to an embodiment of the disclosure.

Turning now to FIG. 3, a method 300 is described. In an embodiment, the method 300 may be performed in the context of the communication system 100 described hereinabove with reference to FIG. 1. For example, several of the steps of method 300 may be performed by a server computer, for example server computer 120. Assignment of a Mobile Directory Number (MDN) to a UE may be detected at block 302. In some embodiments, an Electronic Serial Number (ESN) may be used in the method 200 and/or 300 in place of or in addition to the MDN. In response to the detection, at least one data store may be queried at block 304 in order to identify demographic data and usage data associated with a subscriber account to which the MDN has been assigned. In some cases, the MDN may have been previously assigned to the subscriber account.

At block 306, an amplitude of user interest may be calculated for each of a plurality of predefined interest categories, based on an analysis of the demographic data and the usage data. Query, at block 307, at least one data store in response to the detection in order to identify service provider ranking rules.

At block 308, at least one application may be ranked according to priority of inclusion in a customized interface pack tailored to areas of user interest, wherein priority is determined based at least in part on the calculated amplitude of user interest in the interest categories. The customized interface pack may be assembled at block 310, wherein the customized interface pack comprises least one application chosen based on priority of inclusion. At block 312, the customized interface pack may be installed on the UE. The processing of block 312 may be performed by the server computer 120 or by another server computer, for example by an activation server computer.

Figure 4:
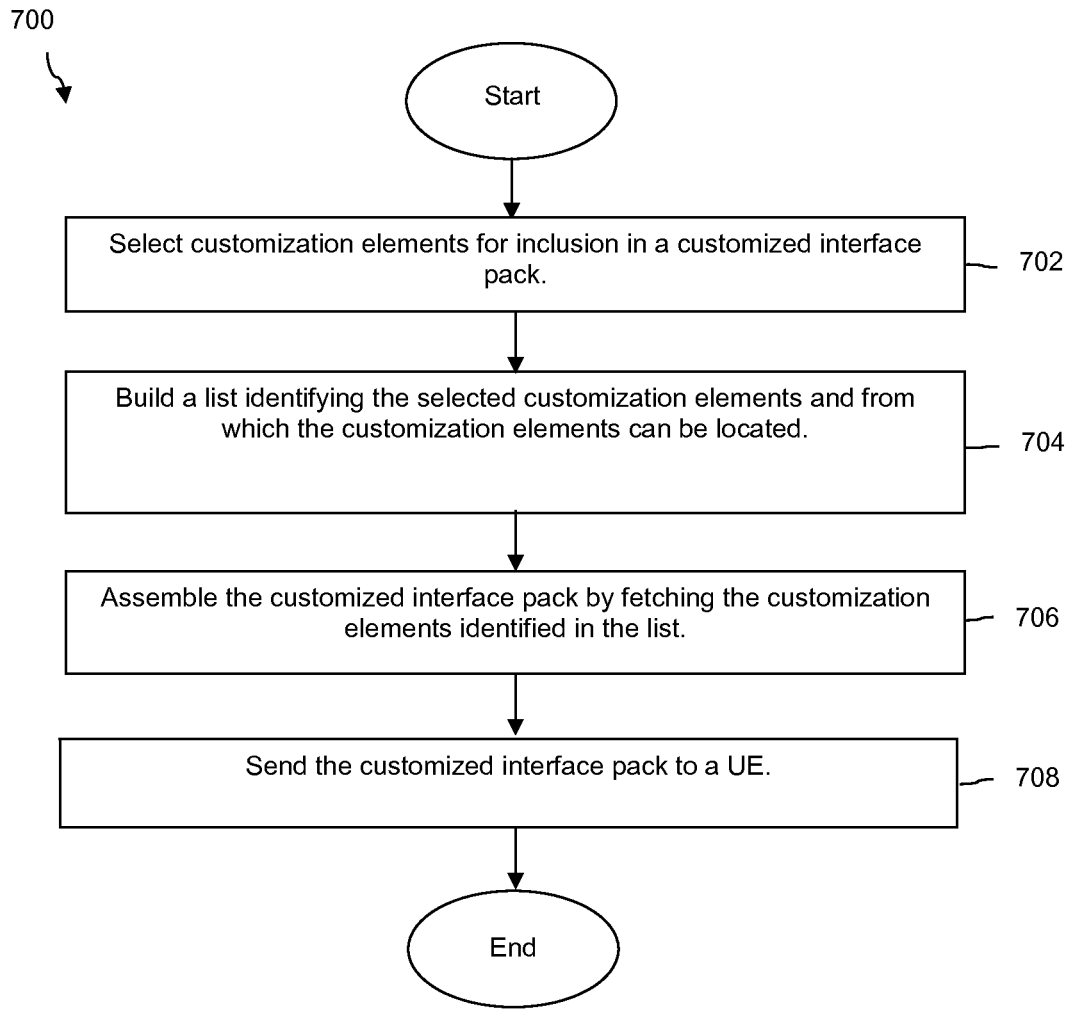
FIG. 4 is a flowchart of a method according to an embodiment of the disclosure.

Turning now to FIG. 4, a method 700 is described. In an embodiment, the method 700 may be performed in the context of the communication system 100 described hereinabove with reference to FIG. 1. For example, the steps of the method 700 may be performed at least in part by the server computer 120. The method 700 may be used to construct embodiments of customized interface packs described herein. Customization elements may be selected for inclusion in a customized interface pack at block 702. The customization elements may be selected by a selection tool based on priority of inclusion determined as described hereinabove. A list may be built at block 704. The list may identify the selected customization elements and may be configured to allow the customization elements to be located. In an embodiment, the list may be built in Extensible Markup Language (XML) and may further identify open slots in an interface pack template in order to guide placement of customization elements.

At block 706, the customized interface pack may be assembled by fetching customization elements identified in the list, which may be accomplished through the use of a compilation program configured to read the list. The customized interface pack may be sent to a UE at block 708. In an embodiment, the customized interface pack may be sent in a single payload. Archiving file formats that support data compression may be used in order to facilitate transmission in a single payload. For example, the customized interface pack may be sent as a .zip file or other unitary file. The customized interface pack may be sent to the UE by the server computer 120 or by another server computer, for example by an activation server computer that promotes activation processes for the UE.

Figure 5:
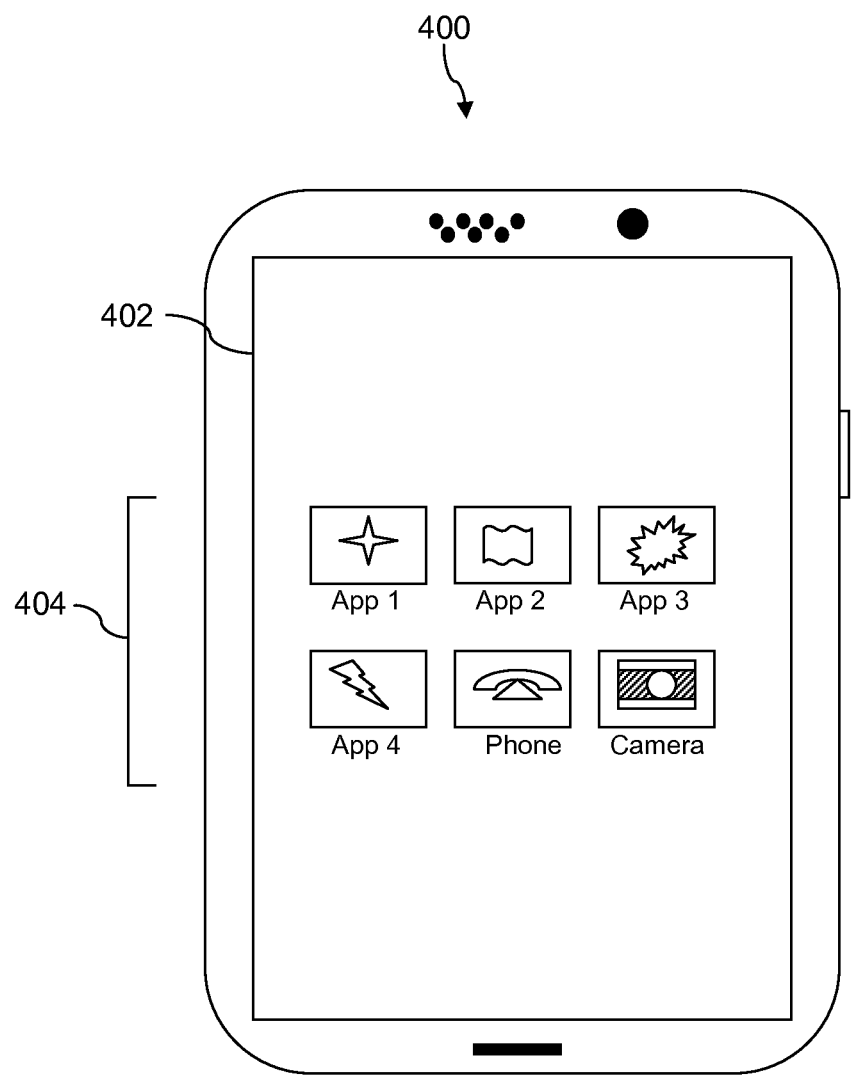
FIG. 5 is an illustration of a mobile device according to an embodiment of the disclosure.

FIG. 5 depicts the user equipment (UE) 400, which is operable for implementing aspects of the present disclosure, but the present disclosure should not be limited to these implementations. Though illustrated as a mobile smart phone, the UE 400 may take various forms including a wireless handset, a pager, a personal digital assistant (PDA), a gaming device, or a media player. The UE 400 may be an example of or a specific embodiment of the UE 102 discussed above with reference to FIG. 1. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. Some of the application icons 404 may be associated with applications installed during the default installation procedure described above, for example applications 132 selected based on customization logic or rules as applied based on the individual profile, demographics, and/or history of a user associated with the UE 400. Some of the application icons 404 may be stub applications or thumbnail images associated with the full applications.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
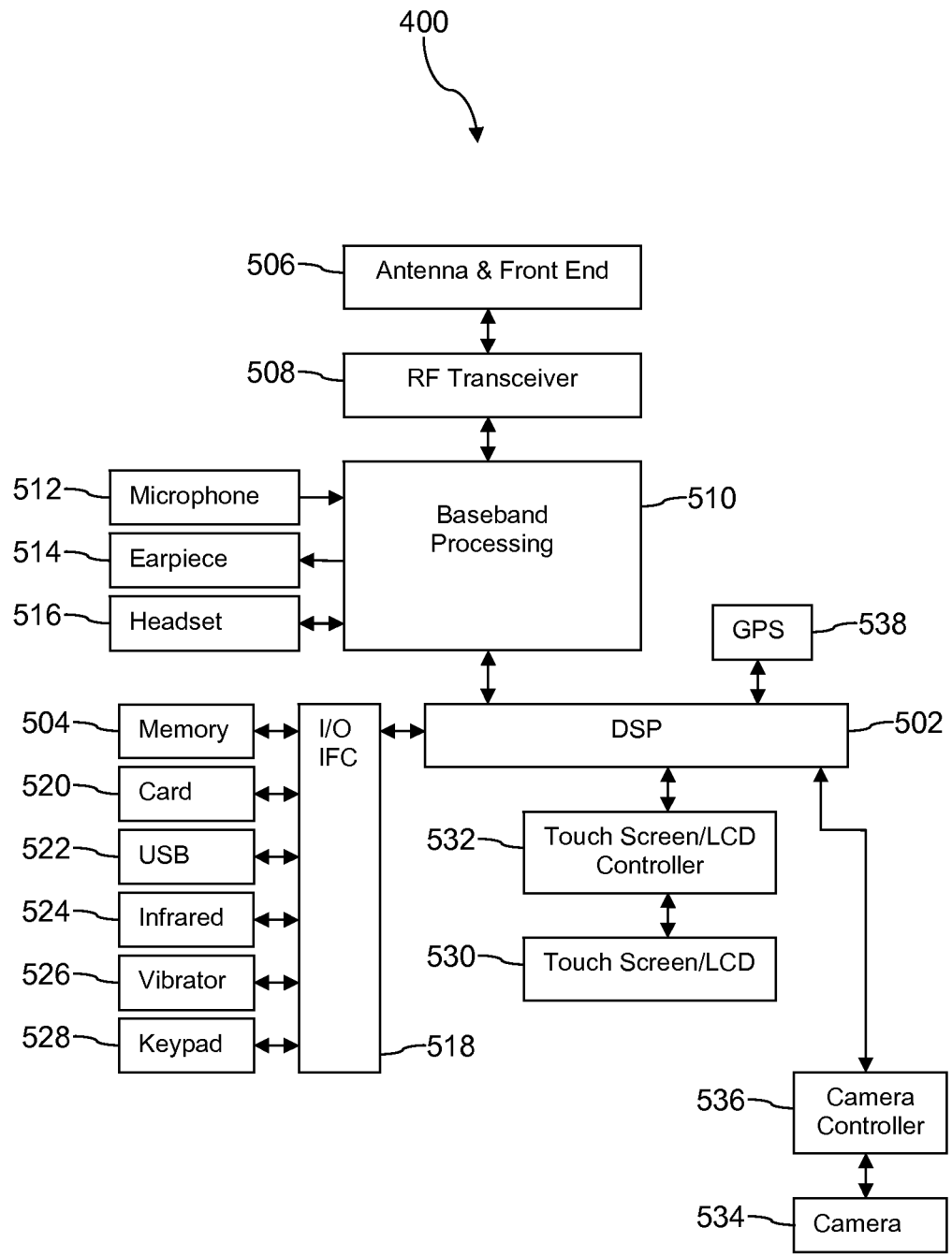
FIG. 6 is a block diagram of a hardware architecture of a mobile device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
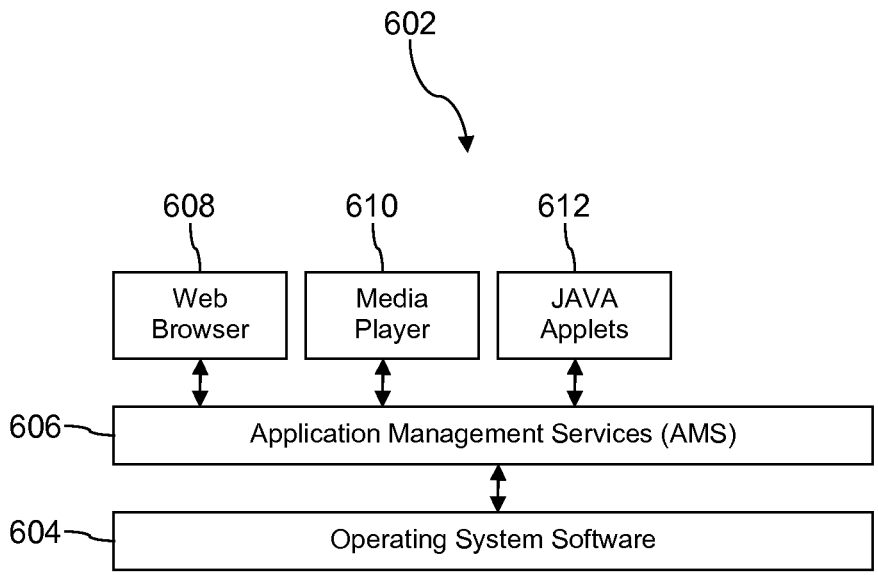
FIG. 7A is a block diagram of a software architecture of a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
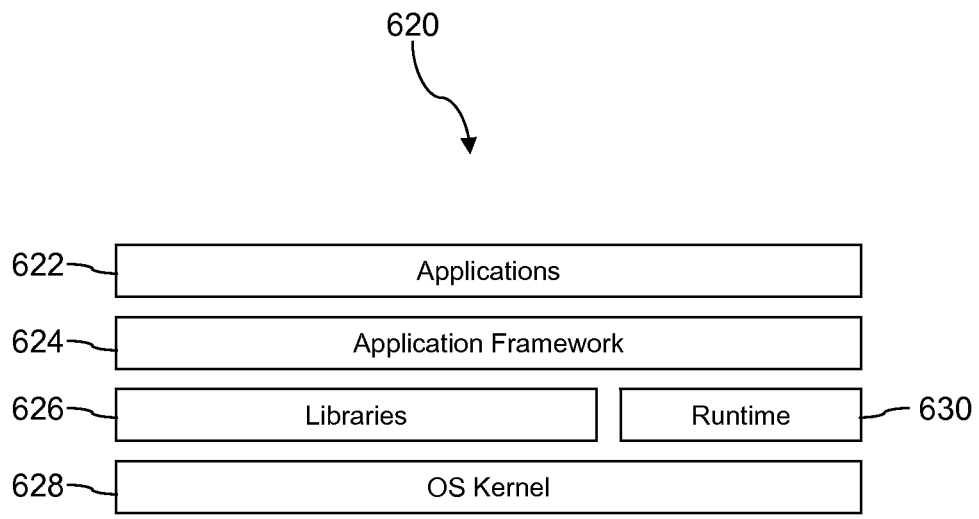
FIG. 7B is a block diagram of another software architecture of a mobile device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
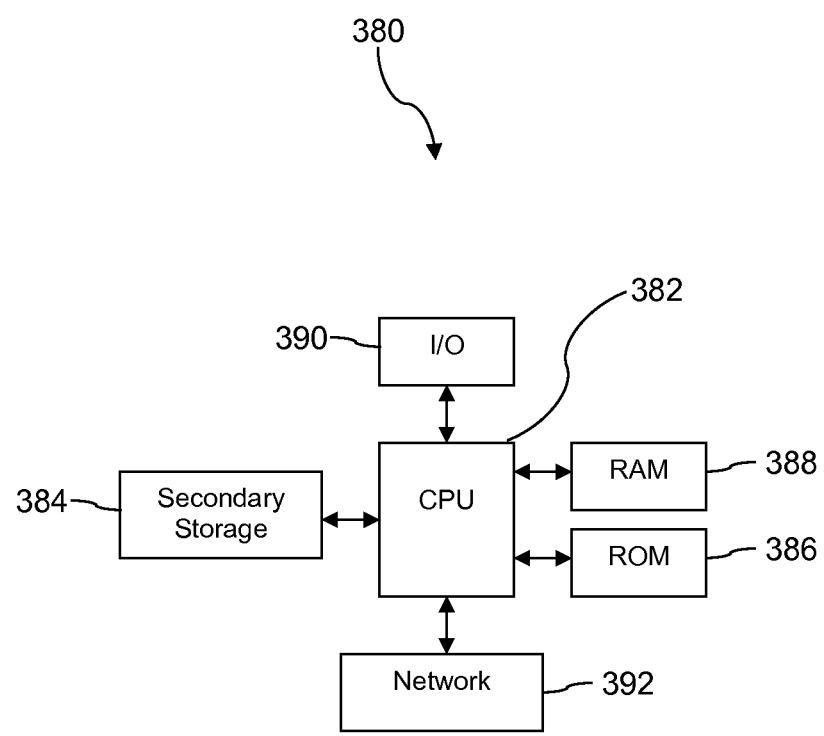
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a dynamically customized default application installation to a user equipment (UE), comprising:
   detecting, by a server computer, that a UE is being activated, wherein the UE is a mobile communication device;
   during activation of the UE and in response to the detecting;
      querying, by the server computer, at least one data store to identify demographic data and usage data associated with a subscriber account to which the UE has been assigned;

calculating, by the server computer, an amplitude of user interest in each of a plurality of predefined interest categories, based on an analysis of the demographic data and the usage data;

ranking, by the server computer, at least one application according to priority of inclusion in a customized interface pack tailored to areas of user interest, wherein priority is determined at least in part based on the calculated amplitude of user interest in the interest categories;

assembling, by the server computer, the customized interface pack, wherein assembling the customized interface pack comprises including one or more applications in the customized interface pack based on priority of inclusion;

sending the customized interface pack to the UE during the activation of the UE, wherein the customized interface pack and the one or more applications are installed on the UE; and completing activation of the UE by a server computer, wherein the customized interface pack is available on the UE in response to completing activation.

2. The method of claim 1, wherein the applications included in the customized interface pack are stub applications.

3. The method of claim 1, wherein the demographic data comprises information about at least one of: user income, user gender, user occupation, and user geographic location.

4. The method of claim 1, wherein the usage data comprises information about at least one of: application usage history, website visitation history, historical home screen configuration, and transactions completed using a previous UE.

5. The method of claim 1, wherein the priority of an application is positively affected when the usage data indicates one or more of previous usage of the application and previous usage of at least one application similar in type to the application.

6. The method of claim 1, wherein priority is further determined based on application compatibility with the UE, whereby applications that are incapable of functioning properly on the UE are assigned the lowest priority.

7. The method of claim 1, wherein the customized interface pack is assembled from a pre-existing interface pack template comprising at least one slot configured to support an application that appeals to a UE user.

8. A method of provisioning a dynamically customized default installation of applications to a user equipment (UE), comprising:

detecting, by a server computer, that a UE is being activated, wherein the UE is a mobile communication device;

during activation of the UE and in response to the detecting:

querying, by the server computer, at least one data store to identify demographic data and usage data associated with a subscriber account to which the UE has been assigned;

calculating, by the server computer, an amplitude of user interest in each of a plurality of predefined interest categories, based on an analysis of the demographic data and the usage data;

querying, by the server computer, in response to the detecting, at least one data store to identify service provider ranking rules;

ranking, by the server computer, at least one application according to priority of inclusion in a customized interface pack tailored to areas of user interest, wherein priority is determined based on an evaluation of the application in view of both the calculated amplitude of user interest in the interest categories and identified service provider ranking rules;

assembling, by the server computer, the customized interface pack, wherein the customized interface pack comprises at least one application chosen based on priority of inclusion;

installing the customized interface pack and the at least one application chosen based on priority of inclusion on the UE during the activation of the UE; and completing activation of the UE by a server computer, wherein the customized interface pack is available on the UE in response to completing activation.

9. The method of claim 8, wherein the customized interface pack further comprises wallpaper and at least one ring tone targeted to areas of user interest.

10. The method of claim 8, wherein the at least one application chosen based on priority of inclusion comprises a stub application.

11. The method of claim 8, wherein the customized interface pack comprises a generic interface pack if there is insufficient demographic data and usage date to identify any areas of user interest.

12. The method of claim 8, further comprising:

maintaining an interface pack template comprising customization elements determined to be of user interest based on an analysis of the demographic data and usage data, wherein the interface pack template is configured to facilitate assembly of the customized interface pack.

13. The method of claim 12, wherein customization elements comprises at least three of applications, web widgets, network services, ring tones, ringback tones, alerting tones, wallpapers, and interface controls.

14. The method of claim 13, wherein the interface pack template is updated periodically based on an analysis of the demographic data and usage data.

15. A server computer configured to assemble a customized interface pack, comprising:

a processor;

a memory; and a server application stored in the memory that, when executed by the processor during activation of a user equipment (UE) and in response to detecting that the UE is being activated, configures the processor to:

query at least one data store to identify demographic data and usage data associated with a subscriber account to which the UE has been assigned, wherein the UE is a mobile communication device;

calculate an amplitude of user interest in each of a plurality of predefined interest categories, based on an analysis of the demographic data and the usage data;

rank at least one application according to priority of inclusion in a customized interface pack tailored to areas of user interest, wherein priority is determined based on the calculated amplitude of user interest in the interest categories;

assemble the customized interface pack, wherein the customized interface pack comprises at least one application chosen based on priority of inclusion;

send the customized interface pack to the UE during the activation of the UE, wherein the customized interface pack and the at least one application chosen based on priority of inclusion are installed on the UE; and complete activation of the UE, wherein the customized interface pack is available on the UE in response to the activation being completed.

16. The server computer of claim 15, wherein the customized interface pack comprises at least one stub application.

17. The server computer of claim 15, wherein the demographic data comprises information about at least one of: user income, user gender, user occupation, and user geographic location.

18. The server computer of claim 15, wherein the usage data comprises information about at least one of: application usage history, website visitation history, historical home screen configuration, and transactions completed using a previous UE.

19. The server computer of claim 15, wherein the priority of an application is positively affected when the usage data indicates one or more of previous usage of the application and previous usage of at least one application similar in type to the application.

20. The server computer of claim 15, wherein priority is further determined based on application compatibility with the UE.

\* \* \* \* \*